US012645127B2

(12) United States Patent (10) Patent No.: US 12,645,127 B2
Sano (45) Date of Patent: Jun. 2, 2026

(54) TUNABLE INTERFERENCE FILTER

(71) Applicant: SEIKO EPSON CORPORATION, Tokyo (JP)

(72) Inventor: Akira Sano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 223 days.

(21) Appl. No.: 18/426,391

(22) Filed: Jan. 30, 2024

(65) Prior Publication Data

US 2024/0255826 A1 Aug. 1, 2024

(30) Foreign Application Priority Data

Feb. 1, 2023 (JP) ................................. 2023-014038

(51) Int. Cl.
*G02F 1/21* (2006.01)
*G02B 5/28* (2006.01)
*G02B 26/00* (2006.01)

(52) U.S. Cl.
CPC .............. *G02F 1/213* (2021.01); *G02B 5/28* (2013.01); *G02B 5/284* (2013.01); *G02B 26/001* (2013.01)

(58) Field of Classification Search
CPC .......... G02F 1/213; G02B 5/28; G02B 26/001
See application file for complete search history.

(56) References Cited

U.S. PATENT DOCUMENTS 9,372,337 B2 * 6/2016 Arakawa .............. G02B 26/001
2022/0082744 A1 3/2022 Nakamura

FOREIGN PATENT DOCUMENTS

JP 2022050102 A 3/2022

* cited by examiner

*Primary Examiner* — Nathanael R Briggs
(74) *Attorney, Agent, or Firm* — CHIP LAW GROUP

(57) ABSTRACT

A tunable interference filter includes: a first substrate provided with a first reflection film; and a second substrate provided with a second reflection film facing the first reflection film with a gap between the first reflection film and the second reflection film. The first substrate includes a movable portion that is a portion where the first reflection film is provided, a diaphragm portion surrounding the movable portion, and a base portion supporting the movable portion via the diaphragm portion to allow displacement of the movable portion in a thickness direction, the diaphragm portion is a portion in which a thickness at the first substrate is thinner than a thickness of the base portion due to a groove opened in a surface of the first substrate, and a width of a bottom portion of the groove is larger than a width of an opening of the groove.

5 Claims, 6 Drawing Sheets

Figure 5:
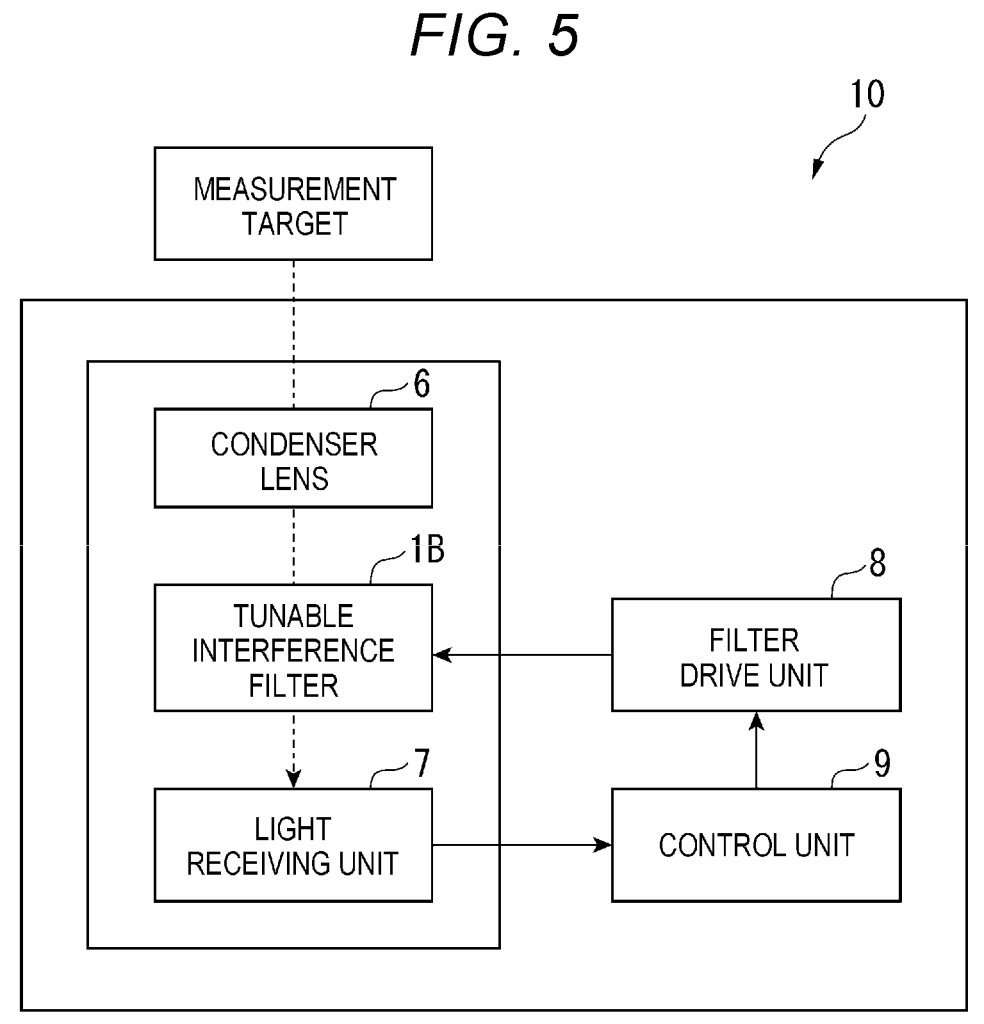

MEASUREMENT TARGET

CONDENSER LENS    6

TUNABLE INTERFERENCE FILTER    1B

FILTER DRIVE UNIT    8

LIGHT RECEIVING UNIT    7

CONTROL UNIT    9

TUNABLE INTERFERENCE FILTER

The present application is based on, and claims priority from JP Application Serial Number 2023-014038, filed Feb. 1, 2023, the disclosure of which is hereby incorporated by reference herein in its entirety.

BACKGROUND

1. Technical Field

The present disclosure relates to a tunable interference filter.

2. Related Art

In the related art, a tunable interference filter is known in which a spectral wavelength is made variable by changing a gap between a pair of reflection films. For example, a tunable interference filter disclosed in JP-A-2022-50102 includes a first substrate provided with a first reflection film, a second substrate provided with a second reflection film facing the first reflection film with a gap between the first reflection film and the second reflection film, and an actuator for changing the gap.

In such a tunable interference filter, the first substrate includes a movable portion that is a portion where the reflection film is provided, and a diaphragm portion surrounding a periphery of the movable portion. Here, the diaphragm portion is a portion made thin by a groove formed in the first substrate, and the gap is changed by moving the movable portion toward the second substrate while the diaphragm portion is deformed.

JP-A-2022-50102 is an example of the related art.

In the first substrate of the tunable interference filter as described above, rigidity of the diaphragm portion is related to a width of the groove formed in the first substrate. When the rigidity of the diaphragm portion can be reduced, there is an advantage that power required for the actuator for changing the gap can be reduced. However, when the width of the groove formed in the first substrate is simply increased in order to reduce the rigidity of the diaphragm portion, there is a problem that a filter region formed by the pair of reflection films becomes small or the entire tunable interference filter becomes large.

SUMMARY

A tunable interference filter according to an aspect of the present disclosure includes: a first substrate provided with a first reflection film; and a second substrate provided with a second reflection film facing the first reflection film with a gap between the first reflection film and the second reflection film. The first substrate includes a movable portion that is a portion where the first reflection film is provided, a diaphragm portion surrounding the movable portion, and a base portion supporting the movable portion via the diaphragm portion to allow displacement of the movable portion in a thickness direction of the first substrate, the diaphragm portion is a portion in which a thickness at the first substrate is thinner than a thickness of the base portion due to a groove opened in a surface of the first substrate, and a width of a bottom portion of the groove is larger than a width of an opening of the groove in a width direction of the groove.

BRIEF DESCRIPTION OF THE DRAWINGS

FIG. 5 is a block diagram showing a schematic configuration of a spectroscopic camera according to a third embodiment.

DESCRIPTION OF EMBODIMENTS

First Embodiment

Hereinafter, a tunable interference filter according to a first embodiment will be described.

Overall Configuration of Tunable Interference Filter 1

Figure 1:
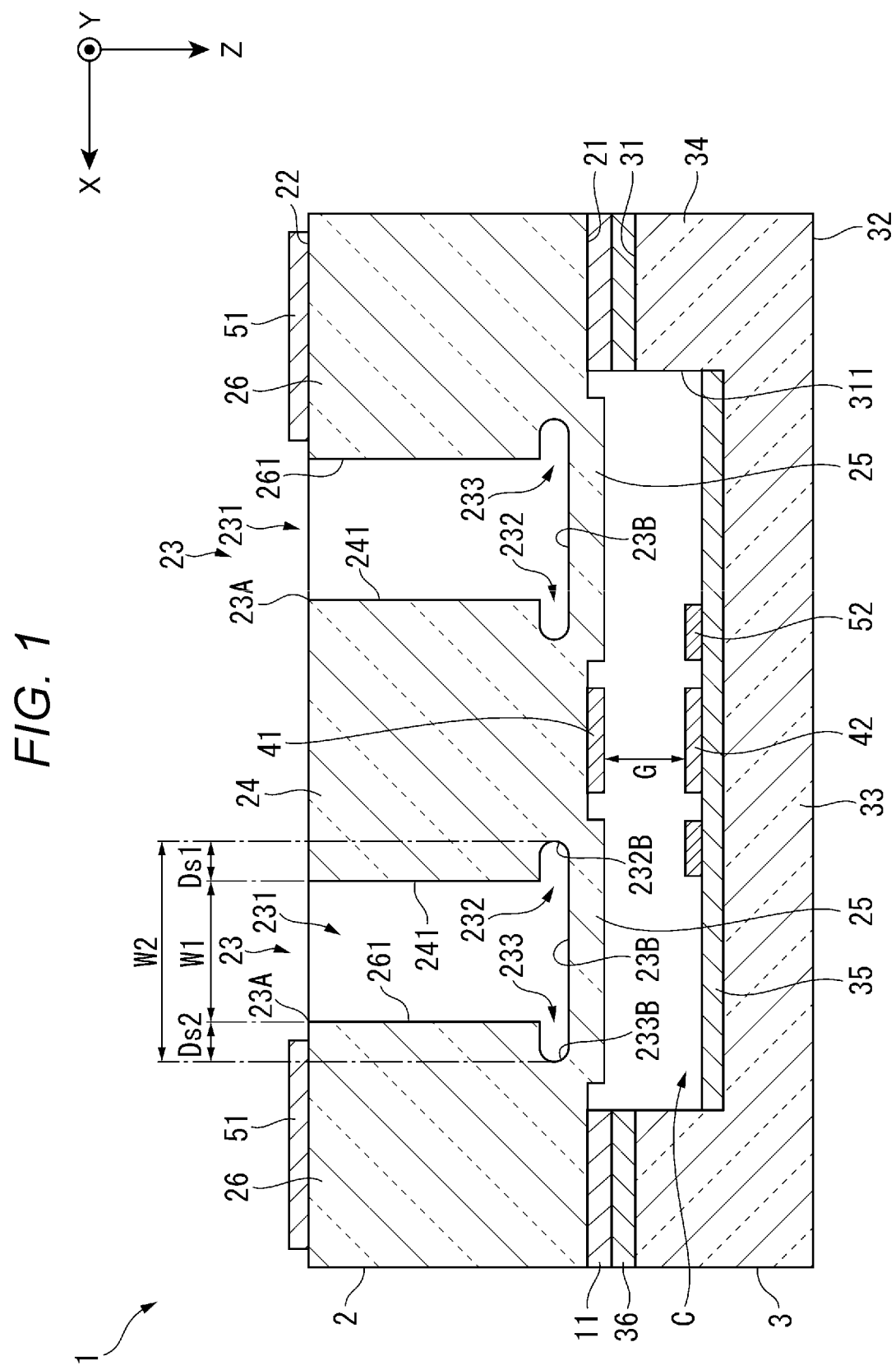
FIG. 1 is a cross-sectional view showing a tunable interference filter according to a first embodiment.
Figure 2:
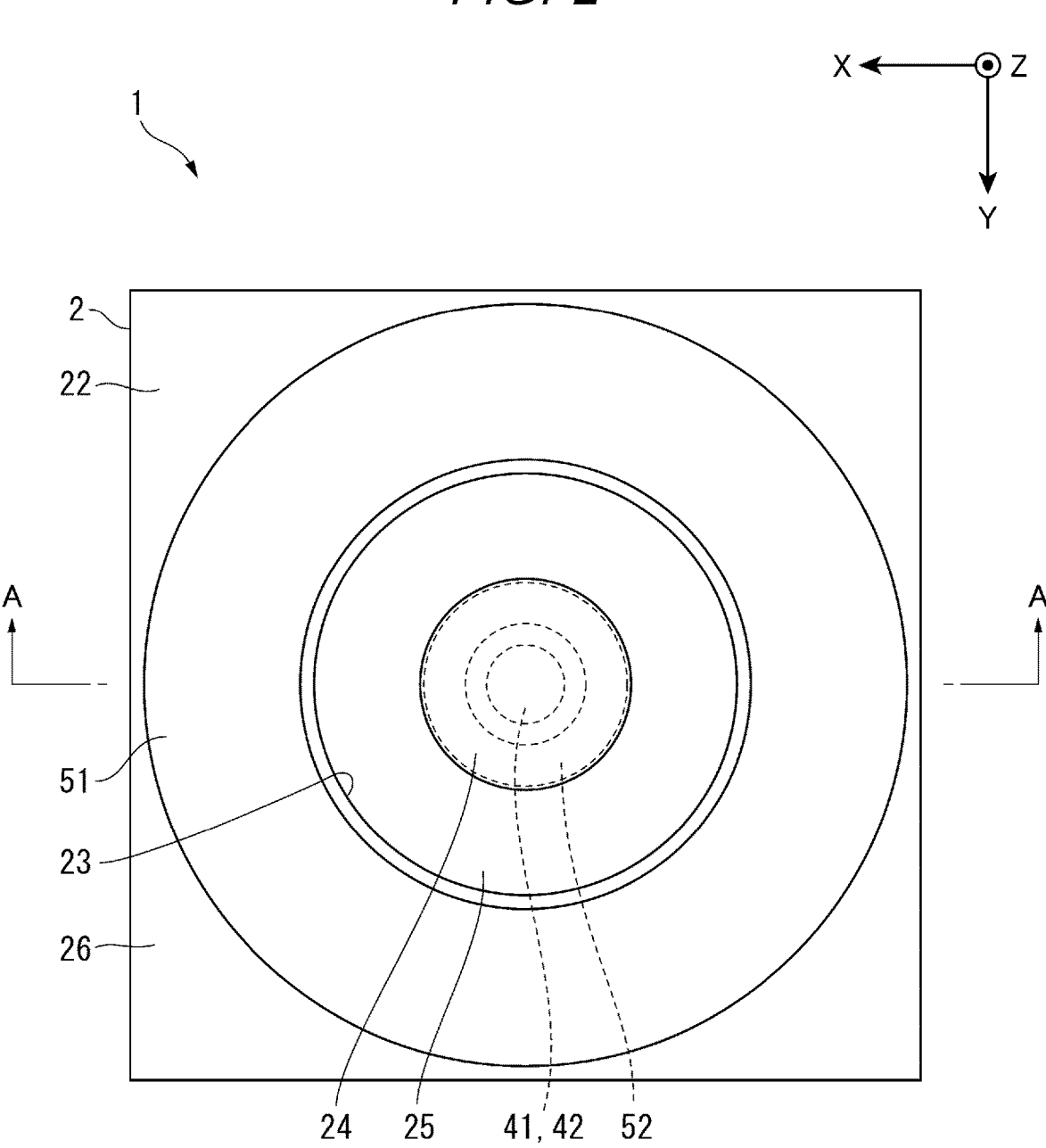
FIG. 2 is a plan view showing the tunable interference filter according to the first embodiment.

FIG. 1 is a cross-sectional view showing a tunable interference filter 1 according to the first embodiment. FIG. 2 is a plan view showing the tunable interference filter 1. FIG. 1 corresponds to a cross-sectional view taken along line A-A in FIG. 2. The tunable interference filter 1 is a spectral filter capable of changing a transmission wavelength according to a drive voltage input from outside.

As shown in FIGS. 1 and 2, the tunable interference filter 1 according to the embodiment includes a first substrate 2 and a second substrate 3 that face each other, a first reflection film 41 and a first electrode 51 that are provided at the first substrate 2, and a second reflection film 42 and a second electrode 52 that are provided at the second substrate 3.

In the following description, a direction from the first substrate 2 toward the second substrate 3 is referred to as a Z direction, a direction orthogonal to the Z direction is referred to as an X direction, and a direction orthogonal to the Z direction and the X direction is referred to as a Y direction. The Z direction corresponds to a thickness direction of the first substrate 2.

The first substrate 2 and the second substrate 3 are formed of a material enabling transmission of light. In the embodiment, each of the first substrate 2 and the second substrate 3 is a silicon substrate enabling transmission of light, and has conductivity. The first substrate 2 and the second substrate 3 are integrally configured as a structure that forms a cavity C therebetween.

The first substrate 2 has a first surface 21 that faces the second substrate 3 and a second surface 22 that is a surface opposite to the first surface 21. When the first substrate 2 is viewed in the Z direction, an annular groove 23 surrounding the first reflection film 41 is formed at the second surface 22 of the first substrate 2. Accordingly, the first substrate 2 includes a movable portion 24 that is a portion where the first reflection film 41 is provided, a diaphragm portion 25 surrounding the movable portion 24, and a base portion 26 supporting the movable portion 24 via the diaphragm portion 25 to allow displacement of the movable portion 24 in the Z direction. The diaphragm portion 25 is a portion in which a thickness at the first substrate 2 is thinner than thicknesses of the base portion 26 and the movable portion 24 due to the groove 23 in the first substrate 2. A slight step is formed on the first surface 21 of the first substrate 2 so that the diaphragm portion 25 protrudes toward a second substrate 3 side.

The second substrate 3 has a first surface 31 that faces the first substrate 2 and a second surface 32 that is a surface opposite to the first surface 31. A recessed portion 311 is formed in a central portion of the first surface 31 of the second substrate 3. Accordingly, the second substrate 3 includes a bottom portion 33 and a side wall portion 34 annularly protruding from the bottom portion 33. A space in the recessed portion 311 of the second substrate 3 corresponds to the cavity C between the first substrate 2 and the second substrate 3. Insulating layers 35 and 36 are formed at the bottom portion 33 and the side wall portion 34, respectively. The side wall portion 34 is bonded to the base portion 26 of the first substrate 2 via the insulating layer 36 and a bonding layer 11.

The first reflection film 41 is provided at the movable portion 24 of the first substrate 2. The second reflection film 42 is provided at the bottom portion 33 of the second substrate 3. The first reflection film 41 and the second reflection film 42 face each other with a gap G therebetween. A dimension of the gap G corresponds to a wavelength of light transmitted through the tunable interference filter 1. When the tunable interference filter 1 is viewed from the Z direction, a region where the first reflection film 41 and the second reflection film 42 face each other serves as a filter region of the tunable interference filter 1.

As the first reflection film 41 and the second reflection film 42, a metal film of Ag or the like, or an alloy film of an Ag alloy and the like can be used. A dielectric multilayer film formed by alternately stacking a high refractive layer such as $TiO_2$ and a low refractive layer such as $SiO_2$ may be used as the first reflection film 41 and the second reflection film 42.

In the embodiment, the first electrode 51 is provided at the second surface 22 at the base portion 26 of the first substrate 2. The first electrode 51 is formed in an annular shape surrounding the groove 23 so as to be widely provided at the second surface 22 at the base portion 26. Since the first substrate 2 in the embodiment is a silicon substrate having conductivity, the first substrate 2 is maintained at the same potential as the first electrode 51.

The second electrode 52 is provided at the bottom portion 33 of the second substrate 3 via the insulating layer 35 so as to face the movable portion 24. The second electrode 52 is formed in an annular shape so as to surround the second reflection film 42. Although not shown, the second electrode 52 is electrically coupled to an electrode terminal disposed outside the cavity C via lead-out wiring or through wiring formed at the second substrate 3.

In the tunable interference filter 1 having the above configuration, one of the first electrode 51 and the second electrode 52 is grounded, and a drive voltage is input to the other of the first electrode 51 and the second electrode 52, so that electrostatic attraction acts between the first substrate 2 and the second electrode 52. Accordingly, the movable portion 24 is displaced in the Z direction toward the second electrode 52, and the gap G is changed. That is, in the embodiment, the first substrate 2 and the second electrode 52 function as actuators for changing the gap G.
Detailed Configuration of First Substrate 2

In the embodiment, as shown in FIG. 2, the groove 23 formed in the first substrate 2 extends annularly so as to surround the movable portion 24 while being open in the second surface 22 that is a surface of the first substrate 2. Here, a width direction of the groove 23 (hereinafter, referred to as a groove width direction) is a direction perpendicular to the Z direction and an extending direction of the groove 23, and is determined for each position in the extending direction of the groove 23. As shown in FIG. 1, an opening 23A of the groove 23 has a width W1 in the groove width direction.

The groove 23 in the embodiment includes a vertical groove 231 that opens in the second surface 22 of the first substrate 2, and a first lateral groove 232 and a second lateral groove 233 that open in an inner surface of the vertical groove 231 and face each other in the groove width direction.

The vertical groove 231 opens in the second surface 22 of the first substrate 2 and has a depth in the Z direction. An opening of the vertical groove 231 in the second surface 22 of the first substrate 2 corresponds to the opening 23A of the groove 23, and a groove width of the vertical groove 231 is equal to the opening width W1 of the groove 23.

The first lateral groove 232 opens in a side wall 241 of the movable portion 24 facing an inside of the vertical groove 231, and has a depth Ds1 on one side of the vertical groove 231 in the groove width direction. The second lateral groove 233 opens in a side wall 261 of the base portion 26 facing an inside of the vertical groove 231, and has a depth Ds2 on the other side of the vertical groove 231 in the groove width direction. Each of the first lateral groove 232 and the second lateral groove 233 is formed at a position adjacent to a bottom portion of the vertical groove 231, that is, at a position adjacent to the diaphragm portion 25 in the Z direction.

When the first substrate 2 is viewed in the Z direction, the first lateral groove 232 is preferably disposed outside the first reflection film 41 so as not to overlap the first reflection film 41.

In the embodiment, the depths Ds1 and Ds2 of the first lateral groove 232 and the second lateral groove 233 are equal to each other, and widths of the first lateral groove 232 and the second lateral groove 233 are not particularly limited.

Here, a width W2 of a bottom portion 23B of the groove 23 corresponds to a distance from a bottom portion 232B of the first lateral groove 232 to a bottom portion 233B of the second lateral groove 233. In other words, the width W2 of the bottom portion 23B of the groove 23 has a dimension obtained by adding the depth Ds1 of the first lateral groove 232 and the depth Ds2 of the second lateral groove 233 to the width W1 of the opening 23A of the groove 23. In such a configuration, the width W2 of the bottom portion 23B of the groove 23 is larger than the width W1 of the opening 23A of the groove 23.

Since the diaphragm portion 25 is a portion including the bottom portion 23B of the groove 23, a width of the diaphragm portion 25 in the groove width direction corresponds to the width W2 of the bottom portion 23B of the groove 23. That is, the width W2 of the diaphragm portion 25 in the groove width direction is larger than the width W1 of the opening 23A of the groove 23.

The bottom portion 232B of the first lateral groove 232 and the bottom portion 233B of the second lateral groove 233 each have an R shape in a cross section along the groove width direction and the Z direction. Although not shown in detail in FIG. 1, a shape of each of the bottom portions 232B and 233B is formed by a stop layer 27 (see FIG. 3) remaining in a manufacturing method to be described later.
Method for Manufacturing Tunable Interference Filter 1

Next, an example of a method for manufacturing the tunable interference filter 1 in the embodiment will be briefly described with reference to FIG. 3.

Figure 3:
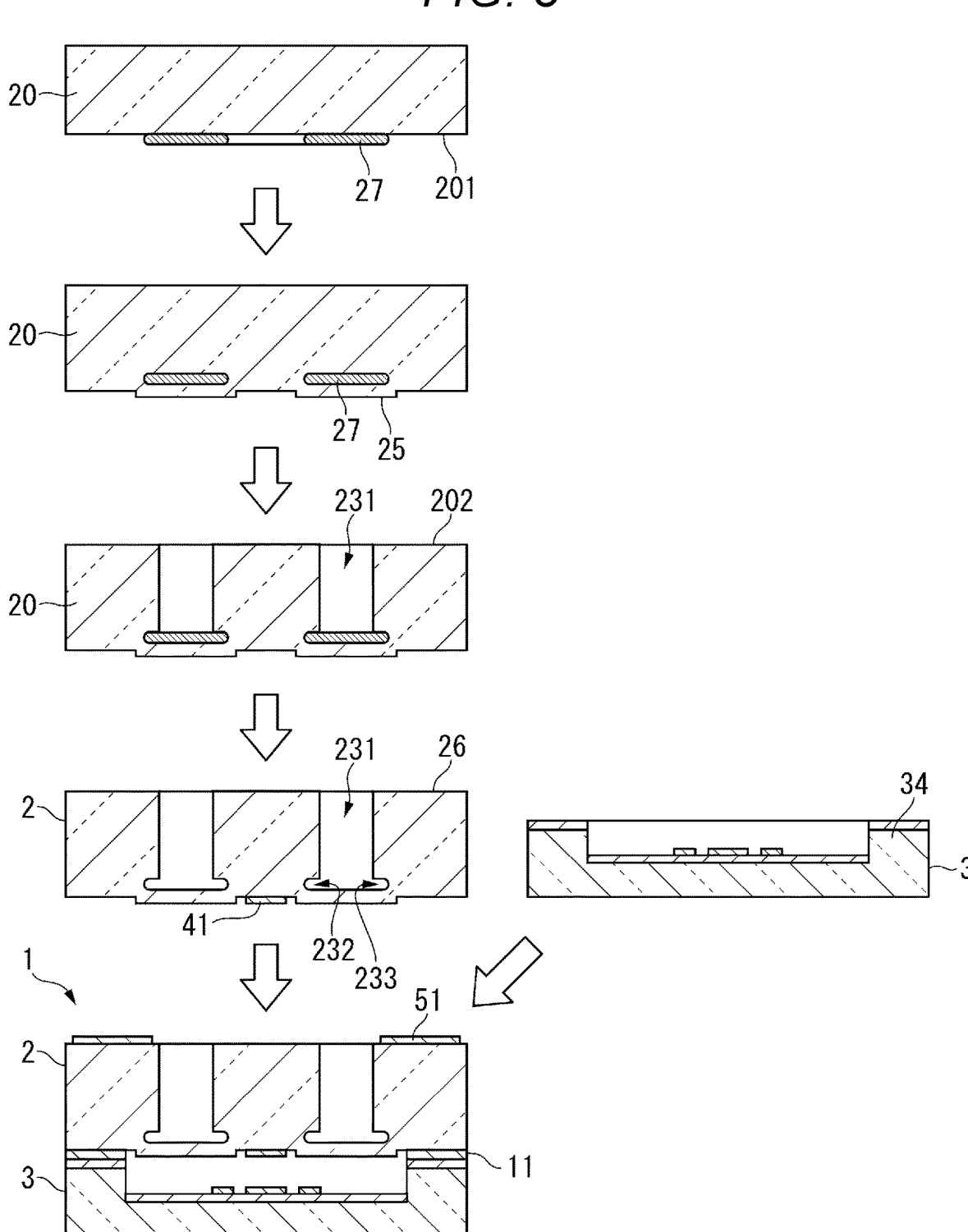
FIG. 3 is a flowchart showing a method for manufacturing the tunable interference filter according to the first embodiment.

First, as shown in a first stage in FIG. 3, the stop layer 27 made of $SiO_2$ or the like is pattern molded on a first surface 201 of a substrate base material 20, which is a base material for the first substrate 2. A formation region of the stop layer 27 corresponds to a region of the bottom portion 23B of the groove 23 in FIG. 1.

Next, a film of a material similar to that of the substrate base material 20 is formed on the first surface 201 of the substrate base material 20 on which the stop layer 27 is formed. Accordingly, as shown in a second stage in FIG. 3, a portion corresponding to the diaphragm portion 25 is formed on the stop layer 27.

Thereafter, dry etching is performed on a region directly above the stop layer 27 in a second surface 202 of the substrate base material 20 until reaching the stop layer 27. Accordingly, as shown in a third stage of FIG. 3, most of the vertical groove 231 is formed.

Next, wet etching is performed on the substrate base material 20 to remove the stop layer 27 from the substrate base material 20. Accordingly, a bottom portion of the vertical groove 231, the first lateral groove 232, and the second lateral groove 233 are formed. By pattern molding the first reflection film 41, the first substrate 2 as shown in a fourth stage in FIG. 3 is formed.

Finally, the bonding layer 11 is formed on each of the base portion 26 of the first substrate 2 and the side wall portion 34 of the separately formed second substrate 3, and bonded by room temperature activation bonding or the like. By pattern molding the first electrode 51 at the first substrate 2, the tunable interference filter 1 is manufactured as shown in a fifth stage in FIG. 3.

The substrate base material 20 may be a chip including regions corresponding to a plurality of first substrates 2. In this case, after performing the above steps in each region of the substrate base material 20 and bonding a chip including a plurality of second substrates 3, the chips may be divided by dicing or the like.

Effects of First Embodiment

In the tunable interference filter 1 according to the embodiment, the diaphragm portion 25 of the first substrate 2 is a portion where the thickness at the first substrate 2 is thinner than the base portion 26 due to the groove 23 that opens in the surface of the first substrate 2, and the width W2 of the bottom portion 23B of the groove 23 is larger than the width W1 of the opening 23A of the groove 23 in the groove width direction.

According to such a configuration, it is possible to increase the width W2 of the bottom portion 23B of the groove 23, that is, the width W2 of the diaphragm portion 25 while keeping the width W1 of the opening 23A of the groove 23. Accordingly, rigidity of the diaphragm portion 25 can be reduced without reducing the filter region formed by the first reflection film 41 and the second reflection film 42 and without enlarging the entire tunable interference filter 1. As a result, power required for the actuator for changing the gap G can be reduced.

In the embodiment, the groove 23 includes the vertical groove 231, the first lateral groove 232, and the second lateral groove 233, and the width of the bottom portion 23B of the groove 23 corresponds to the distance from the bottom portion 232B of the first lateral groove 232 to the bottom portion 233B of the second lateral groove 233.

According to such a configuration, it is possible to suitably reduce the rigidity of the diaphragm portion 25 while keeping a range in which the movable portion 24 serving as a path for light is cut by the groove 23.

In the embodiment, the bottom portion 232B of the first lateral groove 232 and the bottom portion 233B of the second lateral groove 233 each have the R shape in the cross section along the groove width direction and the Z direction.

According to such a configuration, it is possible to prevent concentration of stress when the diaphragm portion 25 is deformed at a boundary portion between the diaphragm portion 25 and the movable portion 24 or the base portion 26. Accordingly, durability of the diaphragm portion 25 can be improved.

The tunable interference filter 1 in the embodiment further includes the first electrode 51 provided at the second surface 22 at the base portion 26 of the first substrate 2, and the second electrode 52 provided at the second substrate 3 so as to face the movable portion 24. The first substrate 2 has conductivity and is electrically coupled to the first electrode 51.

In such a configuration, by inputting a drive voltage to the first electrode 51 or the second electrode 52, the first substrate 2 and the second electrode 52 function as actuators for changing the gap G. Here, at the first substrate 2, since the width W1 of the opening 23A of the groove 23 is kept, the wide second surface 22 at the base portion 26 is ensured, and the first electrode 51 can be widely formed at the second surface 22 at the base portion 26. By increasing an electrode area of the first electrode 51, electrical resistance of the first electrode 51 can be reduced. Accordingly, power consumed by the actuator can be more suitably reduced.

Second Embodiment

Figure 4:
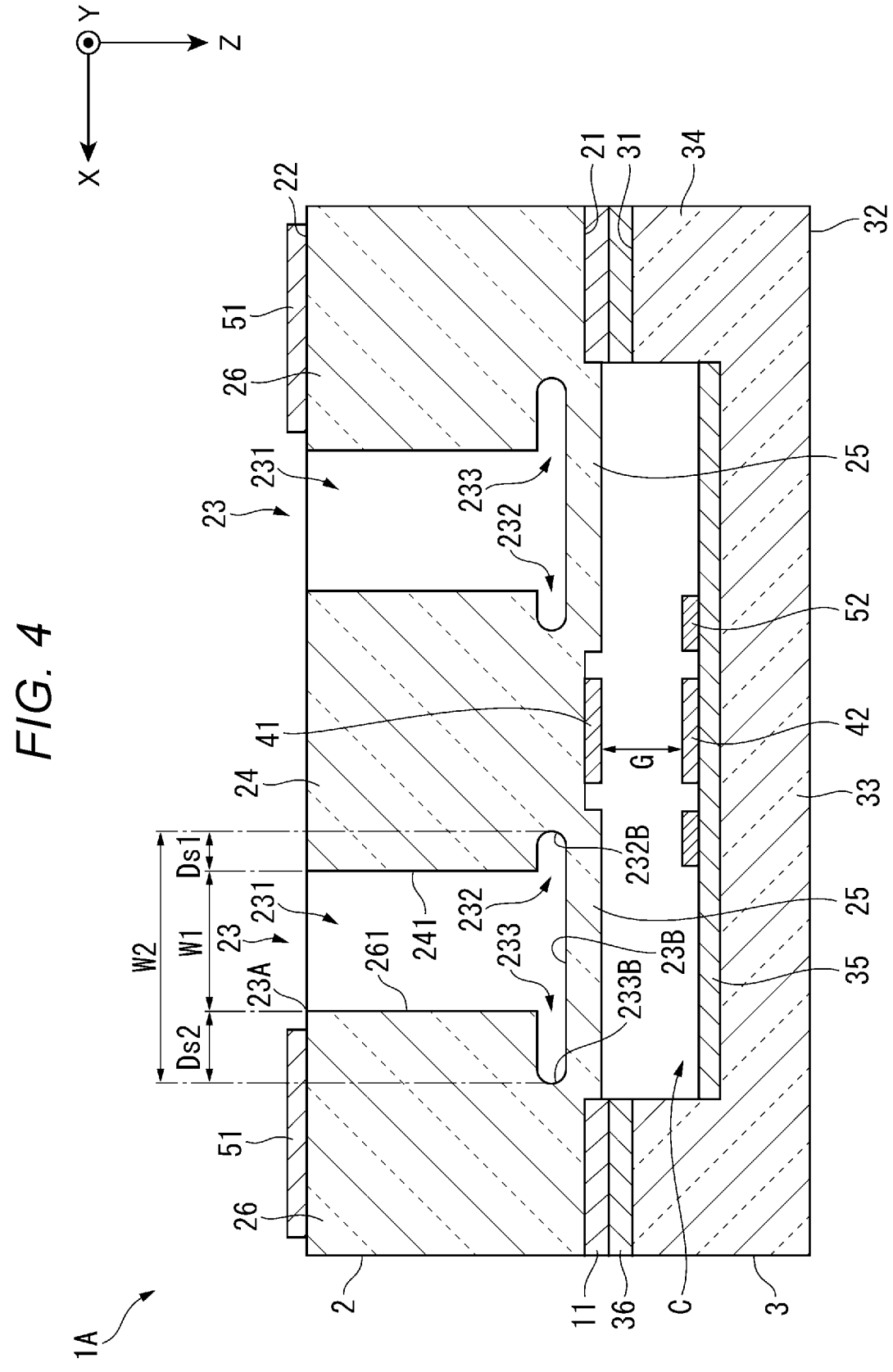
FIG. 4 is a cross-sectional view showing a tunable interference filter according to a second embodiment.

A tunable interference filter 1A in a second embodiment has a similar configuration as the tunable interference filter 1 in the first embodiment except for a configuration of the groove 23. Specifically, as shown in FIG. 4, in the groove 23 in the second embodiment, the depth Ds2 of the second lateral groove 233 is larger than the depth Ds1 of the first lateral groove 232.

In such a second embodiment, it is possible to more suitably reduce the rigidity of the diaphragm portion 25 while keeping the range in which the movable portion 24 serving as the path for light is cut by the groove 23.

In the second embodiment, when the movable portion 24 is displaced toward the second substrate 3 side, the diaphragm portion 25 is deformed such that an opening width of the first lateral groove 232 is reduced and an opening width of the second lateral groove 233 is increased. Therefore, since the depth Ds2 of the second lateral groove 233 is larger than the depth Ds1 of the first lateral groove 232, the rigidity of the diaphragm portion 25 can be efficiently reduced.

Third Embodiment

FIG. 5 is a block diagram showing a schematic configuration of a spectroscopic camera 10 according to a third embodiment. The spectroscopic camera 10 according to the third embodiment can be used by being incorporated into various devices such as a printer, a projector, and a drone, and can acquire a two-dimensional spectroscopic spectrum, chromaticity, and the like of a measurement target.

As shown in FIG. 5, the spectroscopic camera 10 includes a condenser lens 6 that converges measurement light reflected by the measurement target, a tunable interference filter 1B having substantially the same configuration as that in the first embodiment, a light receiving unit 7 that receives light transmitted through the tunable interference filter 1B, a filter drive unit 8, and a control unit 9.

The condenser lens 6 includes, for example, one or more lenses.

The light receiving unit 7 is, for example, an image sensor such as a CCD or a CMOS, and outputs a light receiving signal corresponding to an amount of received light to the control unit 9.

The filter drive unit 8 is a circuit that drives the tunable interference filter 1B, and inputs a drive voltage to the first electrode 51 or the second electrode 52.

The control unit 9 outputs a drive command to the filter drive unit 8 according to a target wavelength or the like specified by the outside.

In the spectroscopic camera 10, the tunable interference filter 1B can change a spectral wavelength according to the drive voltage of the filter drive unit 8 controlled by the control unit 9. The spectroscopic camera 10 guides the measurement light reflected by the measurement target to the tunable interference filter 1B while converging the measurement light by the condenser lens 6, and receives the measurement light dispersed by the tunable interference filter 1B by the light receiving unit 7, so that the measurement target can be spectroscopically imaged.

Figure 6:
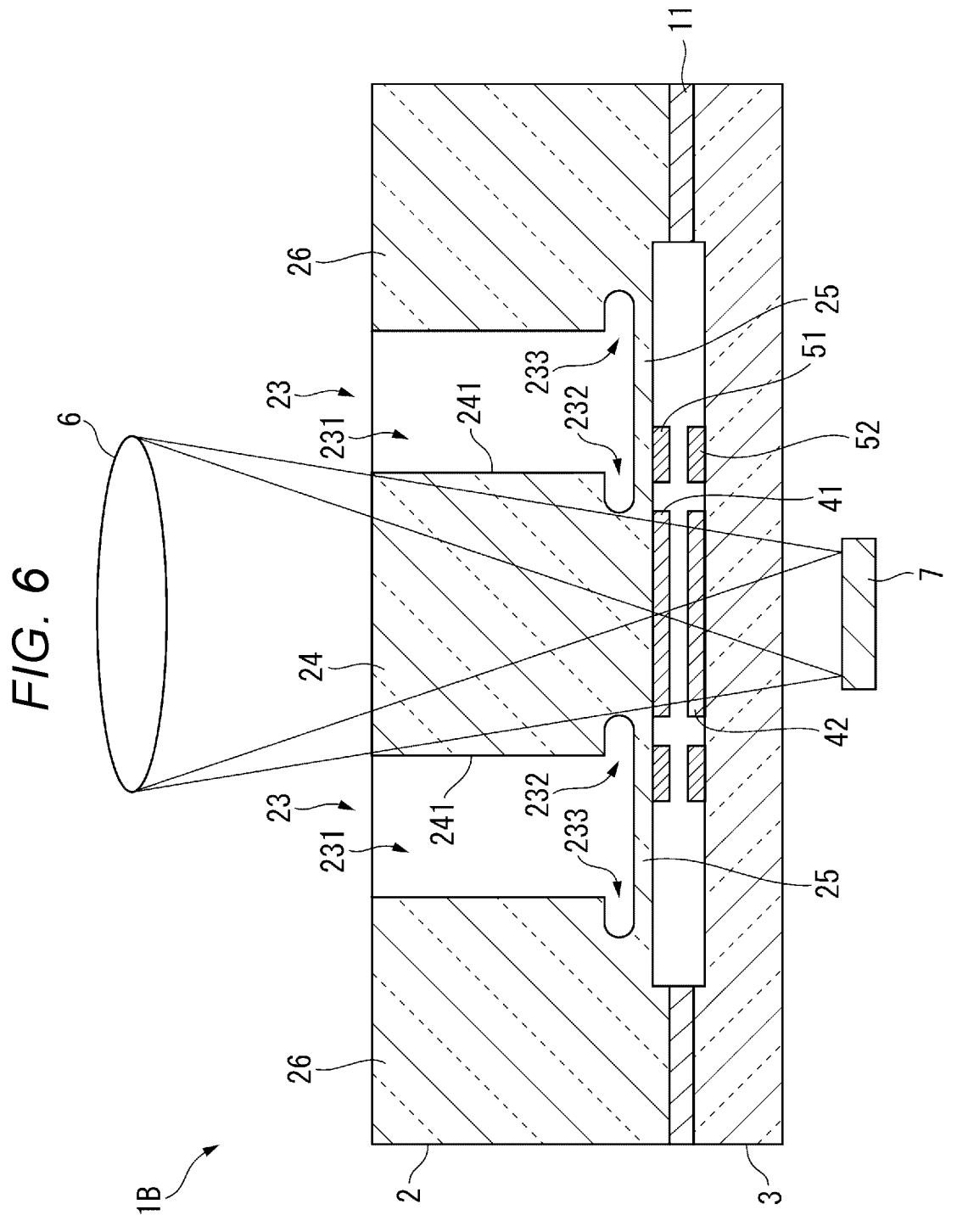
FIG. 6 is a cross-sectional view schematically showing a tunable interference filter and peripheral elements according to the third embodiment.

The tunable interference filter 1B in the embodiment is different from that in the first embodiment in terms of an actuator for changing the gap G. Specifically, as shown in FIG. 6, the first electrode 51 is provided at the first substrate 2 so as to face the second electrode 52. The first substrate 2 and the second substrate 3 do not have conductivity, and are formed of various types of glass, quartz crystal, or the like. The insulating layers 35 and 36 in the first embodiment may be omitted.

In such a configuration, one of the first electrode 51 and the second electrode 52 is grounded, and the drive voltage is input to the other of the first electrode 51 and the second electrode 52, so that electrostatic attraction acts between the first electrode 51 and the second electrode 52. That is, in the embodiment, the first electrode 51 and the second electrode 52 function as actuators for changing the gap G.

The tunable interference filter 1B in the embodiment may further include a capacitance detection unit that detects the dimension of the gap G between the first reflection film 41 and the second reflection film 42.

In the spectroscopic camera 10 in the third embodiment, as shown in FIG. 6, the rigidity of the diaphragm portion 25 can be suitably reduced while ensuring a wide movable portion 24 serving as a path for measurement light between the condenser lens 6 and the light receiving unit 7. In particular, by ensuring the wide movable portion 24, it is possible to prevent the measurement light converged by the condenser lens 6 from being reflected by the side wall 241 of the movable portion 24. As a result, an amount of light that can be received by the light receiving unit 7 can be increased.

The spectroscopic camera 10 in the third embodiment may include the tunable interference filter 1 in the first embodiment or the tunable interference filter 1A in the second embodiment, instead of the tunable interference filter 1B.

Modifications

The present disclosure is not limited to the above embodiments, and modifications, improvements, and the like within a scope that can achieve the object of the present disclosure are in the present disclosure.

8

Modification 1

In the first embodiment, the depth Ds2 of the second lateral groove 233 is equal to the depth Ds1 of the first lateral groove 232. In the second embodiment, the depth Ds2 of the second lateral groove 233 is larger than the depth Ds1 of the first lateral groove 232, but the depth Ds2 of the second lateral groove 233 may be smaller than the depth Ds1 of the first lateral groove 232.

Modification 2

The groove 23 in each embodiment described above includes the vertical groove 231, the first lateral groove 232, and the second lateral groove 233, but is not limited thereto. That is, the groove 23 may have another shape as long as the width W2 of the bottom portion 23B is larger than the width W1 of the opening 23A. For example, the groove 23 may include one of the first lateral groove 232 and the second lateral groove 233. The groove 23 may have a tapered shape in which the groove width gradually decreases from the bottom portion 23B to the opening 23A. In this case, the first lateral groove 232 and the second lateral groove 233 may be omitted.

Modification 3

The groove 23 in each embodiment described above opens in the second surface 22 that is the surface of the first substrate 2, but may open in the first surface 21 that is a surface of the first substrate 2. Also in this case, similar effects as those of the above embodiments can be achieved.

Modification 4

In the tunable interference filters 1, 1A, and 1B in the embodiments, when the first substrate 2 is viewed in the Z direction, the diaphragm portion 25 has an annular shape, but is not limited thereto. For example, the diaphragm portion 25 may surround the movable portion 24, and may have an annular shape having a rectangular outer shape, or may have an annular shape intermittently formed in a through hole of the first substrate 2.

Modification 5

The tunable interference filters 1, 1A, and 1B in the embodiments are transmission spectral filters that transmit light with a desired wavelength, but may be reflection spectral filters that reflect light with a desired wavelength.

Modification 6

A method for manufacturing the tunable interference filters 1, 1A, and 1B in the embodiments is not limited to the method described in the first embodiment, and the tunable interference filters 1, 1A, and 1B can be manufactured by any method.

SUMMARY OF PRESENT DISCLOSURE

A tunable interference filter according to the present disclosure includes: a first substrate provided with a first reflection film; and a second substrate provided with a second reflection film facing the first reflection film with a gap between the first reflection film and the second reflection film. The first substrate includes a movable portion that is a portion where the first reflection film is provided, a diaphragm portion surrounding the movable portion, and a base portion supporting the movable portion via the diaphragm portion to allow displacement of the movable portion in a thickness direction of the first substrate, the diaphragm portion is a portion in which a thickness at the first substrate is thinner than a thickness of the base portion due to a groove opened in a surface of the first substrate, and a width of a bottom portion of the groove is larger than a width of an opening of the groove in a width direction of the groove.

According to such a configuration, it is possible to increase the width of the bottom portion of the groove, that is, a width of the diaphragm portion while keeping the width of the opening of the groove. Accordingly, rigidity of the diaphragm portion can be reduced without reducing a filter region formed by the first reflection film and the second reflection film and without enlarging the entire tunable interference filter. As a result, power required for the actuator for changing the gap can be reduced.

In the tunable interference filter according to the present disclosure, it is preferable that the groove includes a vertical groove opening in the surface of the first substrate, a first lateral groove opening in a side wall of the movable portion facing an inside of the vertical groove, and a second lateral groove opening in a side wall of the base portion facing the inside of the vertical groove and facing the first lateral groove in the width direction of the groove, and a width of the bottom portion of the groove corresponds to a distance from a bottom portion of the first lateral groove to a bottom portion of the second lateral groove.

According to such a configuration, it is possible to suitably reduce the rigidity of the diaphragm portion while keeping a range in which the movable portion serving as a path for light is cut by the groove.

In the tunable interference filter according to the present disclosure, it is preferable that a depth of the second lateral groove is larger than a depth of the first lateral groove in the width direction of the groove.

According to such a configuration, the rigidity of the diaphragm portion can be efficiently reduced.

In the tunable interference filter according to the present disclosure, it is preferable that each of the bottom portion of the first lateral groove and the bottom portion of the second lateral groove has an R shape in a cross section along the width direction of the groove and the thickness direction of the first substrate.

According to such a configuration, it is possible to prevent concentration of stress when the diaphragm portion is deformed at a boundary portion between the diaphragm portion and the movable portion or the base portion. Accordingly, durability of the diaphragm portion can be improved.

It is preferable that the tunable interference filter according to the present disclosure further includes: a first electrode provided at a surface of the base portion of the first substrate opposite to a second substrate side; and a second electrode provided at the second substrate so as to face the movable portion, and the first substrate has conductivity and is electrically coupled to the first electrode.

In such a configuration, by inputting a drive voltage to the first electrode or the second electrode, the first substrate and the second electrode function as actuators for changing the gap. Here, at the first substrate, since the width of the opening of the groove is kept, the wide second surface at the base portion is ensured, and the first electrode can be widely formed at the second surface at the base portion. By increasing an electrode area of the first electrode, electrical resistance of the first electrode can be reduced. Accordingly, power consumed by the actuator can be more suitably reduced.

What is claimed is:

1. A tunable interference filter comprising:
a first substrate provided with a first reflection film; and
a second substrate provided with a second reflection film facing the first reflection film with a gap between the first reflection film and the second reflection film, wherein
the first substrate includes
a movable portion that is a portion where the first reflection film is provided,
a diaphragm portion surrounding the movable portion, and
a base portion supporting the movable portion via the diaphragm portion to allow displacement of the movable portion in a thickness direction of the first substrate,
the diaphragm portion is a portion in which a thickness at the first substrate is thinner than a thickness of the base portion due to a groove opened in a surface of the first substrate, and
the width of a bottom portion of the groove is larger than a width of an opening of the groove in a width direction of the groove.

2. The tunable interference filter according to claim 1, wherein
the groove includes
a vertical groove opening in the surface of the first substrate,
a first lateral groove opening in a side wall of the movable portion facing an inside of the vertical groove, and
a second lateral groove opening in a side wall of the base portion facing the inside of the vertical groove and facing the first lateral groove in the width direction of the groove, and
the width of the bottom portion of the groove corresponds to a distance from a bottom portion of the first lateral groove to a bottom portion of the second lateral groove.

3. The tunable interference filter according to claim 2, wherein
a depth of the second lateral groove is larger than a depth of the first lateral groove in the width direction of the groove.

4. The tunable interference filter according to claim 2, wherein
each of the bottom portion of the first lateral groove and the bottom portion of the second lateral groove has an R shape in a cross section along the width direction of the groove and the thickness direction of the first substrate.

5. The tunable interference filter according to claim 1, further comprising:
a first electrode provided at a surface of the base portion of the first substrate opposite to a second substrate side; and
a second electrode provided at the second substrate so as to face the movable portion, wherein
the first substrate has conductivity and is electrically coupled to the first electrode.

* * * * *